United States Patent
Burke et al.

(10) Patent No.: US 8,589,156 B2
(45) Date of Patent: Nov. 19, 2013

(54) ALLOCATION OF SPEECH RECOGNITION TASKS AND COMBINATION OF RESULTS THEREOF

(75) Inventors: Paul M. Burke, Bedford, NH (US); Sherif Yacoub, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2055 days.

(21) Appl. No.: 10/888,593

(22) Filed: Jul. 12, 2004

(65) Prior Publication Data

US 2006/0009980 A1  Jan. 12, 2006

(51) Int. Cl.
*G10L 15/00* (2013.01)

(52) U.S. Cl.
USPC .......................................... 704/231; 704/244

(58) Field of Classification Search
USPC ........... 704/231, 233, 236, 251, 270; 455/563
See application file for complete search history.

(56) References Cited

U.S. PATENT DOCUMENTS

| | | | | |
|---|---|---|---|---|
| 5,621,858 A * | 4/1997 | Stork et al. | | 704/232 |
| 5,638,425 A * | 6/1997 | Meador et al. | | 379/88.01 |
| 5,710,864 A * | 1/1998 | Juang et al. | | 704/238 |
| 5,806,028 A * | 9/1998 | Lyberg | | 704/231 |
| 5,812,973 A * | 9/1998 | Wang | | 704/253 |
| 5,842,165 A * | 11/1998 | Raman et al. | | 704/255 |
| 6,061,654 A * | 5/2000 | Brown et al. | | 704/275 |
| 6,078,883 A * | 6/2000 | Guilhaumon et al. | | 704/236 |
| 6,173,259 B1 * | 1/2001 | Bijl et al. | | 704/235 |
| 6,205,261 B1 * | 3/2001 | Goldberg | | 382/310 |
| 6,314,402 B1 * | 11/2001 | Monaco et al. | | 704/275 |
| 6,487,534 B1 * | 11/2002 | Thelen et al. | | 704/270 |
| 6,487,543 B1 * | 11/2002 | Ozaki et al. | | 725/112 |
| 6,513,005 B1 * | 1/2003 | Qin et al. | | 704/254 |
| 6,885,989 B2 * | 4/2005 | McLean et al. | | 704/235 |
| 6,898,567 B2 * | 5/2005 | Balasuriya | | 704/231 |
| 6,985,861 B2 * | 1/2006 | Van Thong et al. | | 704/254 |
| 6,996,525 B2 * | 2/2006 | Bennett et al. | | 704/231 |
| 7,016,835 B2 * | 3/2006 | Eide et al. | | 704/231 |
| 7,099,824 B2 * | 8/2006 | Kushida et al. | | 704/231 |
| 7,146,321 B2 * | 12/2006 | Cyr et al. | | 704/270.1 |
| 7,174,299 B2 * | 2/2007 | Fujii et al. | | 704/275 |
| 7,197,331 B2 * | 3/2007 | Anastasakos et al. | | 455/557 |
| 7,216,075 B2 * | 5/2007 | Takagi | | 704/233 |
| 2002/0046023 A1 * | 4/2002 | Fujii et al. | | 704/231 |
| 2002/0055845 A1 * | 5/2002 | Ueda et al. | | 704/270 |
| 2002/0194000 A1 * | 12/2002 | Bennett et al. | | 704/270 |
| 2003/0110035 A1 * | 6/2003 | Thong et al. | | 704/254 |
| 2003/0120486 A1 | 6/2003 | Brittan et al. | | |
| 2003/0139924 A1 * | 7/2003 | Balasuriya | | 704/231 |
| 2003/0144837 A1 * | 7/2003 | Basson et al. | | 704/231 |
| 2003/0236099 A1 * | 12/2003 | Deisher et al. | | 455/522 |
| 2004/0034527 A1 * | 2/2004 | Hennecke et al. | | 704/231 |
| 2004/0117179 A1 * | 6/2004 | Balasuriya | | 704/231 |
| 2004/0153319 A1 * | 8/2004 | Yacoub | | 704/240 |
| 2004/0192384 A1 * | 9/2004 | Anastasakos et al. | | 455/557 |
| 2005/0065789 A1 * | 3/2005 | Yacoub et al. | | 704/231 |

(Continued)

*Primary Examiner* — Douglas Godbold

(57) ABSTRACT

A system, method, computer-readable medium, and computer-implemented system for optimizing allocation of speech recognition tasks among multiple speech recognizers and combining recognizer results is described. An allocation determination is performed to allocate speech recognition among multiple speech recognizers using at least one of an accuracy-based allocation mechanism, a complexity-based allocation mechanism, and an availability-based allocation mechanism. The speech recognition is allocated among the speech recognizers based on the determined allocation. Recognizer results received from multiple speech recognizers in accordance with the speech recognition task allocation are combined.

19 Claims, 3 Drawing Sheets

(56) References Cited

U.S. PATENT DOCUMENTS

2005/0065790 A1* 3/2005 Yacoub .......................... 704/231
2005/0065796 A1* 3/2005 Wyss et al. .................... 704/270
2005/0182558 A1* 8/2005 Maruta .......................... 701/200
2005/0240404 A1* 10/2005 Gurram et al. ................ 704/231

* cited by examiner

ALLOCATION OF SPEECH RECOGNITION TASKS AND COMBINATION OF RESULTS THEREOF

FIELD OF THE INVENTION

The present invention relates to allocating speech recognition tasks and combining the results thereof.

BACKGROUND

There is a desire in the telecommunication industry to execute large-scale speech recognition applications on mobile handheld devices, e.g., personal digital assistants, mobile phones, and other similar devices and combinations. These devices typically lack the processing power required to accommodate the computing-intensive tasks of recognition and natural language understanding on the device, also referred to as the endpoint, itself. Methods to relocate the recognition portion of the computing-intensive tasks to a remote "backend" in-network recognition system have been proposed and implemented. "Backend" in-network recognition systems are separate from the handheld device employed by a user, but are connected via a telecommunication path, whether the path is a wireless or wired connection, to the user device.

A problem to be addressed in a distributed telecommunication system is where to perform speech recognition. A variety of solutions have been suggested and/or tried in the past:
   speech recognition performed on mobile device;
   speech recognition performed on server; and
   speech recognition performed on a third party/application server.

With respect to speech recognition performed on mobile device, existing mobile devices such as hand held devices, tablet-based personal computers (PCs), and cellular phones are equipped with computing platforms capable of performing, in most cases, lightweight operations. Speech recognition is a complex process requiring analysis of speech signals, extraction of features, searching statistical models (such as Gaussian Mixture Models, Neural Networks, etc.), and combinations of word and language statistics. Resources, such as memory and processing power, on a mobile device are usually limited due to the nature and size of the devices. Therefore, embedded speech recognition software (e.g., Sensory available at <<www.sensoryinc.com>> or fonix available at <<www.fonix.com>>) is suitable for simple tasks; however, speech recognition software requires a larger, more capable computing platform to perform complex tasks.

Performing speech recognition on end-user mobile device may have the following advantages:
   1) recognition is spontaneous as the recognition task on the mobile device starts immediately and there is no network transfer delay;
   2) recognition requires less network connection time; and
   3) convenient for simple recognition tasks.

Speech recognition on mobile device has the following disadvantages:
   1) embedded recognizers usually have limited processing capabilities; and
   2) the recognition task consumes the computing capabilities of the device and slows down other operations executing on the device.

With respect to speech recognition performed on telecom server, many telecommunication operators provide support for backend interactive voice response systems. For example, cellular telecommunication carriers such as Sprint provide support for voice browsing of voicemail messages using a mobile telephone. The telecommunication provider hosts a voice recognizer subsystem (usually on a separate server) to perform speech recognition. Speech recognition on such servers is usually high-end powerful recognizers because computing resources are available to perform complex recognition tasks.

With respect to speech recognition performed on application/third party servers, sometimes, the telecommunication operator does not provide the voice recognition service to the user. In such systems, the voice signal is routed to a third party application provider, which performs the speech recognition and the requested function. Similar to the telecommunication provider-hosted solution, complex recognition tasks are performed by the computing platform of the third party application provider in this solution.

Performing speech recognition on a server (whether the telecommunication provider or a third party) may have the following advantages:
   1) suitable for complex recognition tasks;
   2) recognition accuracy is generally higher in comparison to recognition accuracy of the mobile device; and
   3) mobile device is offloaded from heavy recognition operations thereby enabling the device to be more responsive to the user.

Speech recognition performed on the server has the following disadvantages:
   1) requires a network connection and utilizes the network bandwidth to transfer voice data; and
   2) server computing resources are shared with multiple users and hence the server load is a function of how many callers are using the system simultaneously.

SUMMARY

The present invention allocates speech recognition in a distributed network system including a mobile device. Speech recognition is performed on the mobile device, such as a cellular phone or mobile handheld, and on backend servers, such as a telecom service provider or an application provider. Embodiments of the present invention describe multiple schemas to allocate speech recognition tasks to a plurality of speech recognition engines including recognition engines on mobile devices and servers. These schemas are used to optimize allocation of speech recognition tasks to improve performance in terms of response-time and recognition accuracy. The recognizer results received from the multiple speech recognizers in accordance with the speech recognition task allocation are combined.

A system aspect includes an allocation determination mechanism for determining an allocation of speech recognition tasks among multiple speech recognizers, wherein the multiple speech recognizers are executed on more than one device at least one of which is a mobile device, a task allocation mechanism for allocating speech recognition tasks among multiple speech recognizers based on an allocation determined by the allocation determination mechanism, and a combination mechanism for combining recognizer results received from multiple speech recognizers in accordance with the speech recognition task allocation.

A method aspect includes determining an allocation of speech recognition tasks among multiple speech recognizers, wherein the multiple speech recognizers execute on more than one device at least one of which is a mobile device, allocating speech recognition tasks among multiple speech recognizers based on the determined allocation, and combining recognizer results received from the multiple speech recognizers in accordance with the speech recognition task allocation.

A computer-readable medium aspect includes at least one sequence of machine executable instructions, and the medium bears the executable instructions in machine form, wherein execution of the instructions by a processor causes the processor to: determine an allocation of speech recognition tasks among multiple speech recognizers, allocate speech recognition tasks among multiple speech recognizers based on the determined allocation, and combine recognition results received from the multiple speech recognizers in accordance with the speech recognition task allocation, wherein the multiple speech recognizers execute on more than one device at least one of which is a mobile device.

A computer-implemented system for allocating speech recognition tasks among multiple speech recognizers includes a processor for receiving and transmitting data, and a memory coupled to the processor, the memory having stored therein instructions causing the processor to determine an allocation of speech recognition tasks among multiple speech recognizers, allocate speech recognition tasks among multiple speech recognizers based on the determined allocation, and combine recognition results received from the multiple speech recognizers in accordance with the speech recognition task allocation, wherein the multiple speech recognizers execute on more than one device at least one of which is a mobile device.

Still other advantages of the present invention will become readily apparent to those skilled in the art from the following detailed description, wherein embodiments of the invention are shown and described, simply by way of illustration of the best mode contemplated of carrying out the invention. As will be realized, the invention is capable of other and different embodiments, and its several details are capable of modifications in various respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, an embodiment according to the present invention utilizes multiple speech recognizers each residing on the mobile device, the telecom service provider, or the application service provider, etc., and combines the output of the multiple speech recognizers into a single determined result.

Figure 1:
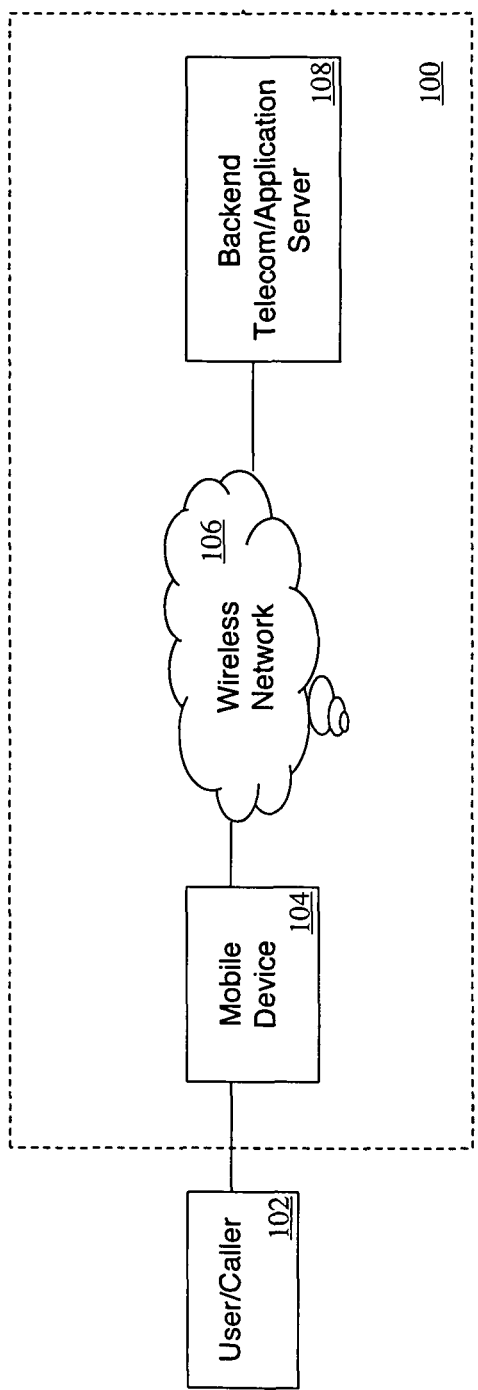
FIG. 1 is a high level block diagram of a system useable in conjunction with an embodiment of the present invention.
Figure 2:
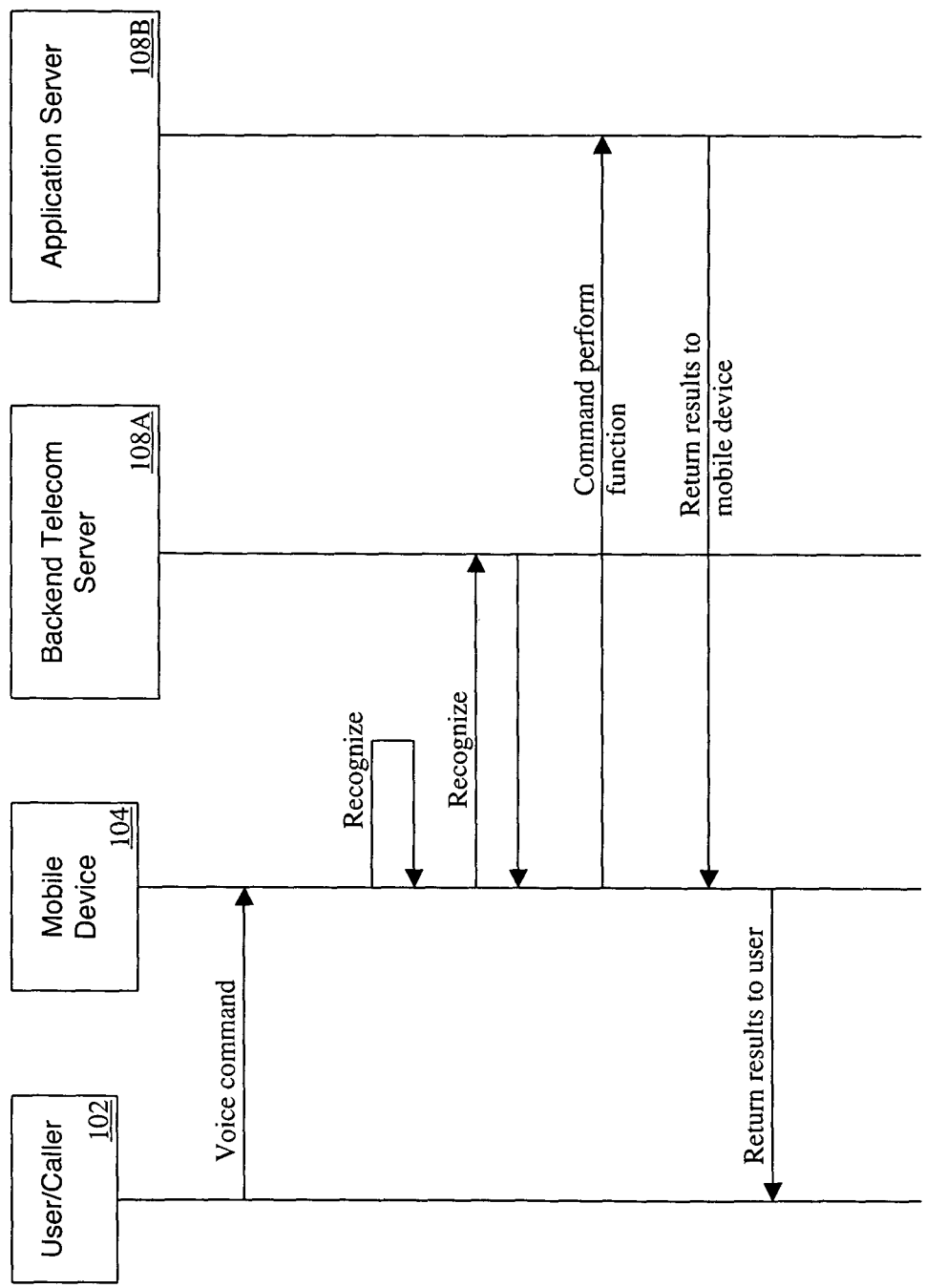
FIG. 2 is a high level object interaction diagram of a method embodiment of performing speech recognition in a system as depicted in FIG. 1.

FIGS. 1 and 2 illustrate a high level structure diagram of a system 100 and a top level object interaction diagram of operations useable in conjunction with the present invention, respectively. System 100 includes a mobile device 104, e.g., a mobile handheld telephone, connectable to a backend telecom/application server 108 via a wireless network 106. Common operations in such a system, as depicted in FIG. 2, include:

a user 102 interacts with system 100 using a voice or speech command;

system 100 (mobile device 104, network backend application executing on server 108A, and application server 108B) uses speech recognition to recognize the user-input command;

a function associated with the user-input command is executed (whether on mobile device 104 or on servers 108A, 108B); and results from performing the requested function are then provided back to user 102.

The following scenarios describe methods according to an embodiment of the present invention to 1) optimize the allocation of the speech recognition task to one or more distributed speech recognizers and 2) combine the result of the distributed tasks into a single recognized result.

Scenario 1: Complexity-Based Allocation

Using a complexity-based allocation scheme, the speech recognition task is allocated to a speech recognizer based on the recognition task's complexity. As discussed supra, lightweight recognition tasks can be performed on mobile device 104 while heavyweight recognition tasks are allocated to server 108. Mobile device 104 is augmented with a speech recognition complexity assessment unit enhancing the capability of mobile device 104 and provides a speech recognition interface to determine whether the recognition task is allocated to the local (on device 104) speech recognizer or to the server 108 recognizer.

Mobile device 104 performs assessment of recognition task complexity by multiple methods. An assessment criterion is to use vocabulary size. Small vocabulary speech recognition tasks are easier and quicker to perform because they require fewer statistical models and lattice search technologies. Hence, embedded recognizers, e.g., installed on mobile device 104, perform such simple tasks. Large vocabulary speech recognition is more difficult, requires more computing resources and is performed by server 108.

As an illustrative example, the conversation dialog between the caller, i.e., user 102, and the application on mobile device 104 may contain simple queries requiring "yes/no" answers. The application prompts user 102 to speak a phone number or a set of digits. Simple speech recognition tasks are allocated to the embedded recognizer on mobile device 104. On the contrary, applications providing the caller with the capability to speak naturally to the application require complex natural language processing and statistical models able to be performed on server 108.

The complexity-based allocation method is performed during the dialog. For instance, a threshold is set on the vocabulary size over which recognition is delegated to server 108. In another embodiment according to the present invention, the dialog design is marked for local (mobile device 104) or remote (server 108) speech recognition. As an implementation example, prompt tags in markup languages such as voice extensible markup language (VoiceXML) or speech application language tags (SALT) are extended to allow the designer to specify a parameter which controls whether recognition for specific user input is performed using an embedded recognizer on mobile device 104 or a remote recognizer on server 108. The dialog interpreter executing on mobile device 104 delegates the recognition task accordingly. If mobile device 104 recognizer is not available or does not exist, the interpreter automatically switches to server 108 based recognition.

In alternate embodiments, dialog interpreter executes on server 108 to determine allocation of recognition tasks between mobile device 104 and server 108.

Scenario 2: Availability-Based Allocation

Using an availability-based allocation scheme, recognizer availability is the determinant for which recognizer is used for a speech recognition task. Mobile device 104 interacts with server 108 over wireless network 106. There will be situations when the speech recognizer on server 108 (the telecom or the application servers) is not available. There are several reasons for such limited availability:

1. The network is inaccessible to mobile device 104. This often happens with wireless devices such as mobile phones where the user moves out of the coverage area or a call is dropped due to uncontrollable circumstances (e.g., driving inside a tunnel).

2. Server 108 is unavailable. Server 108 speech recognizer is a shared resource usable by multiple users 102 connected to the network 106. Server 108 speech recognizers are typically licensed on a per port basis and the number of available ports is usually a fraction of the total number of subscribers. When the number of users 102 connected to the network 106 exceeds the number of available ports, rejection messages are returned (in particular embodiments recognition task queues are used to enqueue recognition tasks until such a time that a port becomes available) to user 102 via mobile device 104.

3. Server 108 times out. If server 108 speech recognizer is heavily loaded due to one of the above-described reasons, a threshold time for completion of the recognition task may be exceeded and mobile device 104 may timeout the recognition task message sent to server 108. Because server 108 may be disconnected from mobile device 104 or the server may be too slow to respond to the mobile device, mobile device 104 initiates the timeout.

Using the availability-based allocation scheme, mobile device 104 switches over to the device-based recognizer when the server 108 based recognizer is unavailable or when the server-based recognizer times out. Although the device 104 recognizer is not a full-fledged recognizer, at times it is acceptable to continue using a limited recognition capability rather than informing the user that speech recognition is unavailable.

Scenario 3: Accuracy-Based Allocation

In scenarios where recognition accuracy is relevant and preferred or important such as phone banking, multiple speech recognizers are used and the output combined to improve recognition accuracy and/or increase confidence in the recognized output. Accuracy-based allocation of speech recognition tasks is also used when the utterances to be recognized are "difficult". This is sometimes the case with mobile phones where the surrounding environment is noisy or another conversation is occurring in the background between other parties. One recognizer executes on the mobile device 104 and other recognizers execute on server 108.

Allocation of speech recognition tasks is determined based on complexity which is measured using one or more of several metrics. For example, the vocabulary of words a user is expected to speak. Low complexity means few alternative words and large complexity means many words. In another example, background noise determines the complexity level. A noise detector is used on mobile device 104, which measures the noise level of the speech signal. If the speech signal is too noisy, i.e., the signal is determined to exceed a preset threshold level, then the signal is determined to be complex. In another example, the number of times a user has to repeat what was spoken is determinative of complexity. If the user repeats what was spoken two or more times, then the signal is determined to be a complex signal. Additional criteria in different embodiments are possible.

As described above, the preset threshold level for complexity is set based on one or more different factors, e.g., noise level, repetitions, etc. In one embodiment, the noise detector on mobile device 104 listens for a preset noise level in determining the complexity. In another embodiment, the particular use, e.g., software application or transaction attempted, by the user of the mobile device 104 determines the complexity. For example, banking transactions often require higher levels of accuracy and thus a higher level of complexity.

After the distributed recognition tasks have been allocated and recognized by the individual recognition engines, e.g., mobile device 104, back-end telecom server 108A, and application server 108B, the individual results are combined to generate a single recognized result. The present inventors have developed several strategies for combining the output of multiple speech recognizers.

In U.S. patent application Ser. No. 10/354,415 filed Jan. 30, 2003 and titled, "Two Engine Speech Recognition", assigned to the present assignee and incorporated herein by reference in its entirety, a technique to combine the output of two speech recognition engines by using statistical analysis of the historical behavior of a recognizer and confusion matrices and two combination methods are described. In a first method, a confusion matrix statistically generated for each speech recognition engine is converted into an alternatives matrix in which every column is ordered by highest-to-lowest probability. A program loop is set up in which the speech recognition output of each speech recognition engine are cross-compared with the alternatives matrices. If the output from the first automated speech recognition (ASR) engine matches an alternative, the output of the first ASR is adopted as the final output. If the vectors provided by the alternatives matrices are exhausted without finding a match, the output from the first speech recognition engine is adopted as the final output. In a second method, the confusion matrix for each ASR engine is converted into a Bayesian probability matrix.

Using one of these two methods, word error rates (WER) are significantly reduced, especially for difficult utterances. Applying this approach to an embodiment according to the present invention, one recognizer executes on mobile device 104 and another recognizer executes on either one of servers 108A, 108B. In contrast to the described two recognition engine description of the above application, the two recognition engines according to the present embodiment are distributed among different devices. The confusion matrices, described in the above-identified application, for the two recognition engines are created using a training set, i.e., a set of input utterances (based on a user's voice) and corresponding transcript of the utterance are used to understand when the recognition engine result is incorrect and correct the recognition engine recognition capability. The training set is used to create the confusion matrix which is later used during execution of the recognition engine when in use by a user.

Because one of the engines executes on mobile device 104, it is important to train the confusion matrices based on different surrounding environments. Mobile device 104 poses a challenge in that the surrounding environment is not deterministic and hence signal quality is affected. In another implementation, the confusion matrix for the engine executed on the mobile device is created based on environment parameters. In fact, several confusion matrices are created based on the surrounding environment. For example, a confusion matrix for a noisy environment and another for a normal environment are generated, e.g., based on a measured signal-to-noise ratio (SNR) detected at mobile device 104. That is, the SNR of a particular environment is compared to a preset threshold value, if the threshold value is exceeded, the environment is determined to be normal. If the threshold value is not exceeded, the environment is determined to be noisy. In alternate embodiments, more than one threshold value may be set to specify different environment types.

In operation, the environment condition is detected based on an audio input and the corresponding confusion matrix is used for combination. That is, an audio environment determination mechanism, e.g., a process executing on mobile device 104 evaluating audio input received by the mobile device, determines an audio environment type at the mobile device. Based on the determined audio environment type, the determination mechanism determines an appropriate confusion matrix for use with the determined audio environment type, e.g., a noisy environment type confusion matrix is used for utterances in a detected noisy environment.

Sequential Try of ASR Engines

In U.S. Patent application having an application Ser. No. 10/339,423 and titled, "Commercial Automatic Speech Recognition Engine Combinations" hereby incorporated by reference in its entirety, a system is described using a primary ASR engine, and based on the result, further processing speech by another supplementary ASR engine. Applying this approach to an embodiment according to the present invention, the embedded recognizer on mobile device 104 is executed first. The accuracy of device 104 recognizer is then measured using an output confidence score, as known to persons of skill in the art. If the output confidence score is below a preset threshold, the recognition task is allocated to server 108 recognizer. Assuming for example, 80% of the utterance are processed by the embedded recognizer on mobile device 104, server 108 recognizer is offloaded 80% of the time. That is, 80% of the recognizer tasks are allocated to the mobile device 104 instead of server 108.

Other multiple recognizer schemes known to persons of skill in the art, such as plurality voting, are usable in connection with an embodiment according to the present invention. Multiple network recognizers can be used, for instance: one on device 104, one on the telecom server 108A, one on the application server 108B, one on third party servers, etc. It is not necessary to have exactly one recognizer on mobile device 104 and exactly one recognizer on server 108, multiple recognizers distributed among additional devices are to be considered within the scope of embodiments of the present invention.

EXAMPLE

In a distributed embodiment according to the present invention, multiple recognizers, i.e., the mobile device 104, back-end telecom server 108A, and application server 108B, receive the same speech for speech recognition processing. According to the distributed embodiment, each recognizer performs speech recognition processing based on the same speech input received and provides the results to the mobile device 104. In an alternate embodiment, the results are provided to either back-end telecom server 108A or application server 108B. In one variation on the distributed embodiment, the mobile device 104 allocates the recognition tasks, using a task allocation mechanism according to one of the above-described approaches, to multiple recognizers based on one or more of the aforementioned allocation methods using an allocation determination mechanism.

Each recognizer processes and provides the results of the recognition processing in a word-by-word fashion to mobile device 104 for combination using a combination mechanism according to one of the above-described approaches. Each of the results provided include at least one determined matching word, a confidence score for the word match, and optionally one or more additional possibilities for each matching word. A matching word and the optional possible matching words each further include a weighting factor. The matching word is more heavily weighted than the possible matching words. The first possible matching word is more heavily weighted than the second possible matching word and so on for each of the possible matching words. In this manner, the best matching words are more heavily weighted.

After receiving each recognizer's results, mobile device 104 combines the results based on a plural voting technique unless a sequential try of ASR engines is being performed. Each word in the recognized result from each recognizer is compared and if at least two out of three recognizer results for a given word match, then that word is selected as the recognized word. If none of the recognizer results match, then the confidence score and weighting for each word recognized by a recognizer are combined to arrive at a comparison value. Mobile device 104 generates a comparison value for each matching word and optional possible matching word from each recognizer result. If a sequential try approach is used, as described above, a preset confidence score is used to determine whether additional recognition engines on additional devices are allocated recognition tasks.

Hardware Overview

Figure 3:
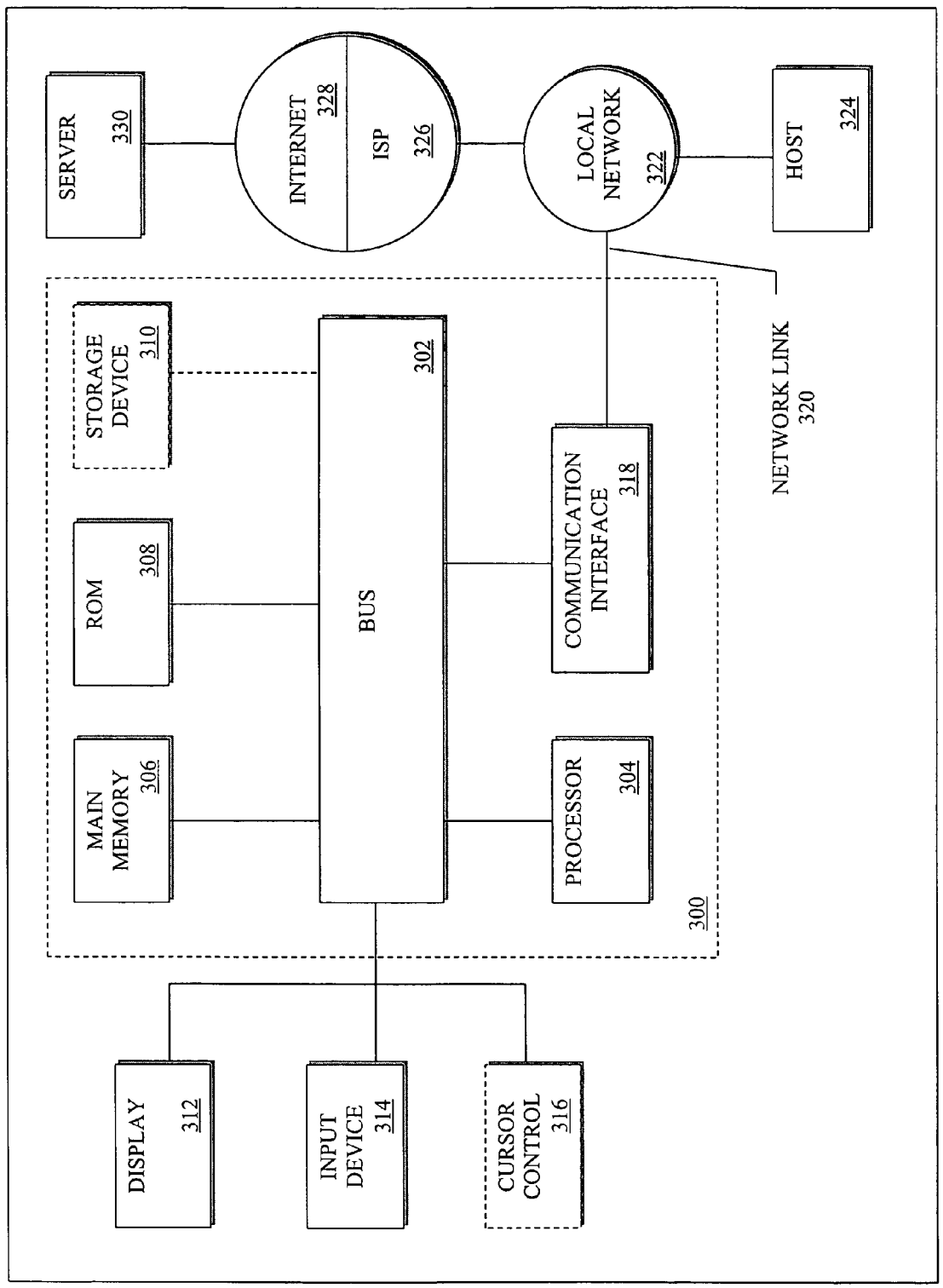
FIG. 3 is a high level block diagram of a computer system usable in conjunction with an embodiment of the present invention.

FIG. 3 is a block diagram illustrating an exemplary computer system 300 upon which an embodiment of the invention may be implemented including server 108 and with some differences mobile device 104. Embodiments of the present invention are usable with currently available handheld devices, personal computers, mini-mainframes, servers, and the like.

Computer system 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing transaction and interaction data, and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. In an alternate embodiment, an optional storage device 310 (dashed line), such as a magnetic disk or optical disk, is provided and coupled to the bus 302 for storing transaction and interaction data, inventory data, orders data, and instructions.

Computer system 300 may be coupled via the bus 302 to a display 312, such as a cathode ray tube (CRT) or a flat panel display, for displaying information and a user interface to user 102. An input device 314, including input keys, is coupled to the bus 302 for communicating information and command selections to the processor 304. Another type of optional user input device is cursor control 316 (dashed line), such as a mouse, a trackball, or cursor direction keys for communicating direction information and command selections to processor 304 and for controlling cursor movement on the display 312. This input device typically has two degrees of freedom in two axes, a first axis (e.g., x) and a second axis (e.g., y) allowing the device to specify positions in a plane.

In an embodiment of computer system 300 for mobile device 104, differing types of input device 314 and cursor control 316 may be used to implement control and input functionality.

Embodiments of the invention are related to the use of computer system 300, such as the illustrated system of FIG. 3, to optimize allocation of speech recognition tasks. According to an embodiment of the invention, the speech recognition tasks are allocated by computer system 300 in response to processor 304 executing sequences of instructions contained in main memory 306 in response to input received via input device 314, cursor control 316, or communication interface 318. Such instructions may be read into main memory 306 from another computer-readable medium, such as storage device 310.

However, the computer-readable medium is not limited to devices such as storage device 310. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an electrically programmable read only memory (EPROM), a FLASH-EPROM, any other memory chip or cartridge, a carrier wave embodied in an electrical, electromagnetic, infrared, or optical signal, or any other medium from which a computer can read. Execution of the sequences of instructions contained in the main memory 306 causes the processor 304 to perform the process steps described above. In alternative embodiments, hard-wired circuitry may be used in place of or in combination with computer software instructions to implement the invention. Thus, embodiments of the invention are not limited to any specific combination of hardware circuitry and/or software.

Computer system 300 also includes a communication interface 318 coupled to the bus 302. Communication interface 308 provides two-way data communication as is known. For example, communication interface 318 may be a wireless communication network, an integrated services digital network (ISDN) card, a digital subscriber line (DSL) card, or a modem to provide a data communication connection to a corresponding type of telephone line. As another example, communication interface 318 may be a local area network (LAN) card to provide a data communication connection to a compatible LAN. Wireless network links may also be implemented. In any such implementation, communication interface 318 sends and receives electrical, electromagnetic or optical signals which carry digital data streams representing various types of information. Of particular note, the communications through interface 318 may permit transmission or receipt of user-provided speech input. For example, two or more computer systems 300 may be networked together in a conventional manner with each using the communication interface 318.

Network link 320 typically provides data communication through one or more networks to other data devices. For example, network link 320 may provide a connection through local network 322 to a host computer 324 or to data equipment operated by an Internet Service Provider (ISP) 326 or a telecommunication service provider. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with embodiments of the invention, one such downloaded application provides for optimizing allocation of speech recognition tasks.

The received code may be executed by processor 304 as it is received, and/or stored in storage device 310, or other non-volatile storage for later execution. In this manner, computer system 300 may obtain application code in the form of a carrier wave.

By simultaneously submitting recognition input to multiple recognition systems with one of the recognition systems being located on the handheld (front end), i.e., device 104, and multiple recognition systems located in the backend, i.e., server 108, overall recognition accuracy and usability are improved over either system alone. Speech recognition is generally accomplished using statistical methods to assign a probability that a spoken phrase matches an expected input. Applications can decide how well a phrase needs to match prior to accepting the input. By setting the percentage very high, a speech recognition system generates more accurate output, but then may need to re-query the user if unsure of the response. By submitting to multiple recognizers, the endpoint, i.e., mobile device 104 resolves simple recognition tasks, i.e., Yes/No queries, while more complex linguistic based recognition are submitted to both device 104 recognizer and server 108 recognizer. While the device 104 recognizer may not be able to handle the complex task quickly, the more powerful in-network server 108 is able to handle more complicated tasks.

There are numerous advantages to the below-described method and apparatus.

Embodiments of the present invention build on the idea that multiple in-network recognizers can be used to optimize the recognition performance (in terms of, for example, accuracy and speed), with the idea that one of the recognition systems exists on the mobile device, e.g., a phone, and then is augmented with in-network recognition.

An embodiment according to the present invention has a distinct advantage over the above-described systems; multiple recognizers are usable (simultaneously or one after the other or one at a time) to improve the recognition accuracy.

It is advantageous to improve quality of service (QoS) and usability of voice interfaces when used as means for soliciting user input from mobile devices, cellular phones, handheld, and wireless tablets. Further, it is advantageous to use multiple distributed recognizers in a network and for a method and apparatus for optimizing allocation of speech recognition tasks among multiple network recognizers to improve accuracy and speed.

Further still, it is advantageous for processor intensive complex speech recognition tasks to be accomplished on the mobile device, while retaining the potential flexibility of having the recognition performed on the server. Further, and related to the previous, it is advantageous to combine lightweight recognition performed on limited capability devices such as cellular phones and full-fledged network recognizers residing on the telecommunication provider or application service provider.

After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A system for using multiple speech recognizers, the system comprising:
   an allocation determination mechanism to determine an allocation of speech recognition tasks among multiple speech recognizers based on a complexity of a speech, wherein the multiple speech recognizers include a mobile-based speech recognizer on a mobile device and a server-based speech recognizer on a server,
   wherein said allocation determination mechanism is to use a threshold set on a vocabulary size to determine the complexity level of the speech,
   a task allocation mechanism to allocate the speech recognition tasks to both the mobile-device-based speech recognizer and the server-based speech recognizer based on a determination by the allocation determination mechanism; and
   a combination mechanism to receive results from the multiple speech recognizers and combine the results into a single result,
   wherein the results from each of the multiple speech recognizers include recognized words and a confidence score for each of the recognized words, and
   wherein, to combine the results, the combination mechanism is to compare the results from the multiple speech recognizers on a word-to-word basis and select a word from one of the multiple speech recognizers as a recognized word for the single result based on the confidence score of that word.

2. The system of claim 1, wherein the allocation determination mechanism is further to determine the allocation of the speech recognition tasks based on a required accuracy of the results and an availability of the multiple speech recognizers.

3. The system of claim 1, wherein the combination mechanism is further to use multiple confusion matrices, each corresponding to an audio environment type at the mobile device, to combine the results received from the multiple speech recognizers.

4. The system of claim 3, further comprising:
   an audio environment determination mechanism to determine an environment condition of the mobile device, and (ii) based on the determined environment condition, select one of multiple confusion matrices for the mobile-device-based speech recognizer for use by the combination mechanism in combining the results.

5. The system of claim 4, wherein said audio environment determination mechanism is to determine a signal to noise ratio of the speech.

6. The system of claim 1, wherein the threshold for complexity is further based on a number of times a user of the mobile device has to repeat what was spoken.

7. The system of claim 1, wherein the allocation determination mechanism is further to determine the allocation of the speech recognition tasks based on an accuracy requirement of a transaction attempted, and a noise level of the speech.

8. The system of claim 1, wherein each of recognized words in the results from the multiple speech recognizers further includes a weighting factor for the word, and
   wherein the combination mechanism is further to select a word from one of the multiple speech recognizers as a recognized word for the single result based on the weighting factor of that word.

9. The system of claim 8, wherein, if a word from the mobile-device-based speech recognizer matches a word from the server-based speech recognizer, the combination mechanism is to select that word as a recognized word for the single result, and
   if a word from the mobile-device-based speech recognizer does not match a corresponding word from the server-based speech recognizer, the combination mechanism is to combine the confidence score and weighting factor of that word to generate a comparison value, and select one of the words based on the comparison values of the words.

10. A method of using multiple speech recognizers, said method comprising:
    determining an allocation of speech recognition tasks among the multiple speech recognizers based on a complexity level of a speech with respect to a threshold, wherein the threshold is based on a vocabulary size, and wherein the multiple speech recognizers include a mobile-device-based speech recognizer on a mobile device and a server-based speech recognizer on a server;
    allocating the speech recognition tasks to both the mobile-device-based speech recognizer and the server-based speech recognizer based on the determined allocation;
    receiving results from the mobile-device-based speech recognizer and the server-based speech recognizer, wherein the results from each of the speech recognizers include recognized words and a confidence score for each of the recognized words; and
    combining the results to generate a single result, including comparing the results from the mobile-device-based speech recognizer and the results from the server-based speech recognizer on a word-to-word basis, and selecting a word from the mobile-device-based speech recognizer or a word from the server-based speech recognizer as a recognized word for the single result based on the confidence score of that word.

11. The method of claim 10, wherein determining the allocation of the speech recognition tasks is further based on at least one of a required accuracy of speech recognition output and an availability of the multiple speech recognizers.

12. The method of claim 10, further comprising:
    generating multiple confusion matrices based on different predetermined audio environment types for the mobile-device-based speech recognizer;
    determining an audio environment type at the mobile device; and
    selecting an appropriate one among the multiple confusion matrices for use in combining the results, based on the determined audio environment type.

13. The method of claim 10, further comprising:
    if the complexity of the speech is below the threshold, allocating the speech recognition tasks to the mobile-device-based speech recognizer, and
    if the results provided by the mobile-device-based speech recognizer are below a predetermined threshold, allocating the speech recognition tasks to the server-based speech recognizer for re-processing.

14. A non-transitory computer-readable medium, on which is stored machine executable instructions which when executed by a processor cause the processor to:
    determine an allocation of speech recognition tasks among multiple speech recognizers based on a complexity of a speech with respect to a threshold, wherein the threshold is based on a vocabulary size and wherein the multiple speech recognizers include a mobile-device-based speech recognizer on a mobile device and a server-based speech recognizer on a server;

allocate the speech recognition tasks to both the mobile-device-based speech recognizer and the server-based speech recognizer based on the determined allocation;

receive results from the mobile-device-based speech recognizer and the server-based speech recognizer, wherein the results from each of the speech recognizers include recognized words and a confidence score for each of the recognized words; and combine the results to generate a single result, including
compare the results from the mobile-device-based speech recognizer and the results from the server-based speech recognizer on a word-to-word basis, and select a word from the mobile-device-based speech recognizer or a word from the server-based speech recognizer as a recognized word for the single result based on the confidence score of that word.

15. The non-transitory computer-readable medium of claim 14, wherein the machine readable instructions, when executed by the processor, are further to cause the processor to determine the allocation of the speech recognition tasks based on a required accuracy of the results and an availability of the multiple speech recognizers.

16. The non-transitory computer-readable medium of claim 14, further comprising instructions which, when executed by the processor, cause the processor to:

generate, for the mobile-device-based speech recognizer, multiple confusion matrices based on different predetermined audio environment types; and determine an audio environment type at the mobile device and select an appropriate one among the multiple confusion matrices for use in combining the results, based on the determined audio environment type.

17. A computer-implemented system for allocating speech recognition tasks among multiple speech recognizers, the system comprising:

a processor; and a memory coupled to the processor, the memory having stored therein instructions causing the processor to:

determine an allocation of the speech recognition tasks among multiple speech recognizers based on a complexity of a speech with respect to a threshold, wherein the threshold is based on a vocabulary size, and wherein the multiple speech recognizers include a mobile-based speech recognizer on a mobile device and a server-based speech recognizer on a server;

allocate the speech recognition tasks to both the mobile-device-based speech recognizer and the server-based speech recognizer based on the determined allocation, and receive results from the mobile-device-based speech recognizer and the server-based speech recognizer, wherein the results from each of the speech recognizers include recognized words and a confidence score for each of the recognized words;

combine the results to generate a single result, including
compare the results from the mobile-device-based speech recognizer and the results from the server-based speech recognizer on a word-to-word basis, and select a word from the mobile-device-based speech recognizer or a word from the server-based speech recognizer as a recognized word for the single result based on the confidence score of that word.

18. The system of claim 17, wherein the instructions, when executed, are further to cause the processor to determine an allocation of the speech recognition tasks based on a required accuracy of the results and an availability of the multiple speech recognizers.

19. The system of claim 17, further comprising instructions which, when executed by the processor, cause the processor to:

generate, for the mobile-device-based speech recognizer, multiple confusion matrices based on different predetermined audio environment types; and determine an audio environment type at the mobile device and select an appropriate one among the multiple confusion matrices for use in combining the results, based on the determined audio environment type.

* * * * *

UNITED STATES PATENT AND TRADEMARK OFFICE
CERTIFICATE OF CORRECTION

PATENT NO.        : 8,589,156 B2                                    Page 1 of 1
APPLICATION NO.   : 10/888593
DATED             : November 19, 2013
INVENTOR(S)       : Paul M. Burke et al.

It is certified that error appears in the above-identified patent and that said Letters Patent is hereby corrected as shown below:

In the Claims

In column 11, line 49, in Claim 4, delete "and (ii)" and insert -- and --, therefor.

Signed and Sealed this
Eighteenth Day of February, 2014

Michelle K. Lee
*Deputy Director of the United States Patent and Trademark Office*